United States Patent [19]

Schatteman

[11] 4,099,213

[45] Jul. 4, 1978

[54] TAPE CASSETTE LOADING SYSTEM

[75] Inventor: Etienne Arthur Marie Schatteman, Wemmel, Belgium

[73] Assignee: Staar, S. A., Brussels, Belgium

[21] Appl. No.: 805,973

[22] Filed: Jun. 13, 1977

[30] Foreign Application Priority Data

Jul. 5, 1976 [FR] France .................. 76 20498

[51] Int. Cl.² .................... G11B 23/04; G11B 15/10; G11B 15/24
[52] U.S. Cl. .................................. 360/137; 242/198; 360/96
[58] Field of Search ................ 360/137, 96, 93; 197/197–201

[56] References Cited

U.S. PATENT DOCUMENTS

| 3,395,871 | 8/1968 | Ackermann | 242/198 |
| 3,638,953 | 2/1972 | Kodama et al. | 242/199 |
| 3,669,457 | 6/1972 | Nozawa et al. | 360/93 |
| 3,752,488 | 8/1973 | Righi | 360/93 |
| 3,936,011 | 2/1976 | Staar | 242/198 |
| 3,950,787 | 11/1974 | Hosaka | 360/137 |

*Primary Examiner*—Alfred H. Eddleman

*Attorney, Agent, or Firm*—Leydig, Voit, Osann, Mayer & Holt, Ltd.

[57] ABSTRACT

Apparatus is disclosed for loading and releasing cassettes of magnetic tape for use in recording and playback equipment; a housing or carriage into which a cassette is introduced by a sliding movement in a plane parallel to its main face, is movably mounted on side frame means by lateral projections on the housing extending through L-shaped slots in the side frame means, so that the housing moves together with the cassette along an L-shaped path. Movable slotted guide members receiving the projections on the housing are supported on each side frame means and a gear set is provided on each side frame means, with one gear of each gear set fixed to a respective slotted guide member, together with a coupling between the gear sets to coordinate the movement of the movable slotted guide members on one side frame means with the movement of the movable slotted guide frame member on the other side frame means. Spring means acting between a pair of gears of one of the gear sets are provided to resiliently force the housing toward its loaded and released positions at the extremities of the L-shaped path.

6 Claims, 4 Drawing Figures

TAPE CASSETTE LOADING SYSTEM

The present invention relates to an apparatus for loading and releasing cassettes in recording and playback equipment of the magnetic tape type. Such cassettes have openings in a main face for receiving tape transport means including capstans and reel drives. More specifically, the invention relates to improvement in apparatus for the loading and for the release of cassettes, which apparatus utilizes a housing into which a cassette is introduced by a sliding movement in a plane parallel to its main face and which moves together with the cassette in an L-shaped path having one segment substantially parallel to said plane and a second segment substantially perpendicular to the said plane, in order to cause the cassette to engage the tape transport means which penetrate the cassette in its loaded position.

An apparatus of this kind is described in U.S. Pat. No. 3,936,011 entitled Tape Cassette Transport. In this known apparatus the guiding means consist of L-shaped guide grooves provided in its side walls. Each of these guide grooves comprises two segments or branches perpendicular to each other, one of which controls the traversing movement of the housing in the plane in which the cassette is introduced and slides, while the other controls the movement of the housing in a direction perpendicular to that plane to move the cassette into operative position. The external lateral sides of the housing are provided with projections engaging the said guide grooves. These projections also undergo the action of spring means positioned in such a way that the whole of the traversing movement of the housing for the purpose of bringing the cassette into alignment with the tape transport elements has to be effected manually and in opposition to the action of the spring means, while the subsequent descending movement of the housing into the operative position is assisted by the action of the spring means.

The release and ejection of the cassette is effected by means of camming plates which are manually pressed into the engaged position underneath the projections of the housing in order to raise the latter in opposition to the force of the aforementioned spring means. The traversing movement of the housing and the ejection of the cassette will then take place under the action of the spring means.

The principal object of the present invention is to improve apparatus of the kind shown in said U.S. Pat. No. 3,936,011 for loading and releasing cassettes, not only fulfilling the same functions as that described above, but also rendering the cassette loading and release operations easier and ensuring that throughout these operations the cassette will be constantly moved parallel to itself by a manipulation which calls for very little effort and attention on the part of the operator while at the same time reducing risk of incorrect operation.

A preferred embodiment of the invention will now be described by way of example and with reference to the accompanying drawings, wherein.

Figure 1:
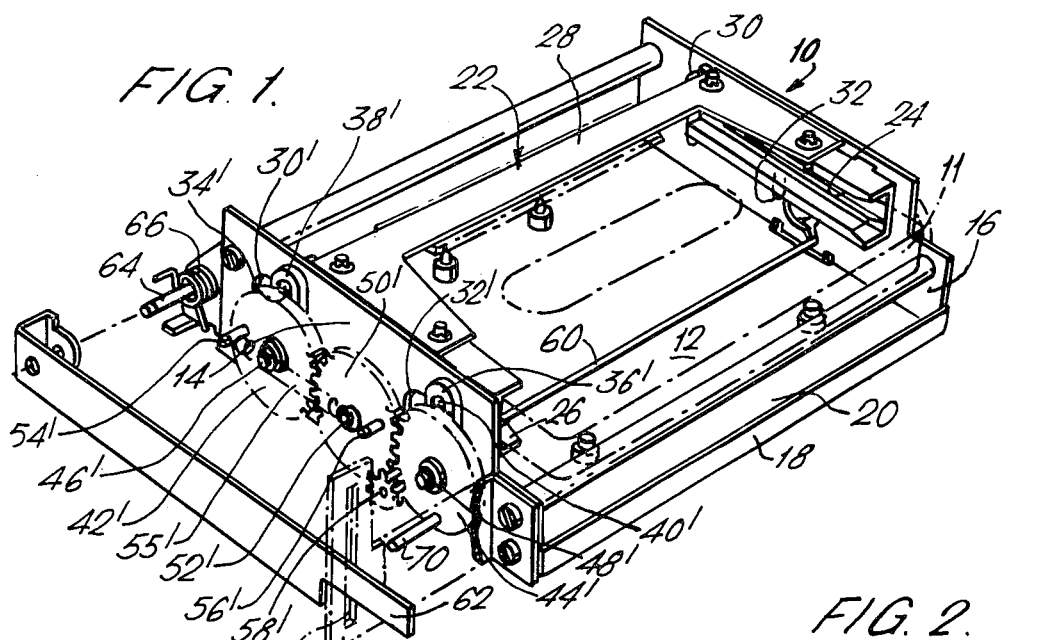
FIG. 1 is a partly exploded view, in perspective, of an apparatus according to the present invention.

The illustrated cassette loading and release apparatus indicated generally at 10 ensures a cassette movement based on the same principles as in the known apparatus described above, the cassette being shown in phantom by 11 at FIG. 1. The apparatus 10 thus comprises a rigid frame 12 defined by a pair of parallel oppositely disposed side frame walls 14 and 16, a base 20 and a transverse member 18. The apparatus includes a movable cassette housing 22 defined by a pair of oppositely disposed channels 24 and 26 interconnected by a transversely extending plate 28. The two channels 24 and 26 are preferably of U-shaped cross section for slidingly receiving a cassette by its side faces.

The upper part of each of the side frame means 14 and 16 is provided with guide grooves 30, 32 and 30', 32', receiving mounting means for the housing in the form of projections 34, 36 and 34', 36', provided on the external lateral sides of the housing 22. Each of the guide grooves 30, 32, 30' and 32' is of generally L-shaped configuration and is defined by two perpendicular segments or branches for the purpose of guiding the housing 22 in an L-shaped path having one segment parallel to the plane in which the cassette 11 is introduced and a second segment in a direction substantially perpendicular to this plane. It is this latter movement of the housing 22 that causes the cassette 11 to engage the tape transport means required to penetrate the cassette. The movements of the housing and of the cassette are therefore similar to those of the apparatus described in the aforementioned U.S. Pat. No. 3,936,011 and to which reference should be made for additional details.

The apparatus 10 may contain an arrangement similar to that described in the aforementioned patent and serving to prevent the loading of a cassette which is not correctly oriented.

Figure 2:
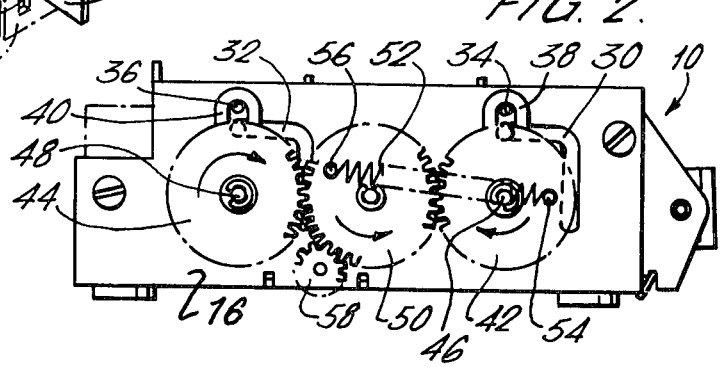
FIGS. 2, 3 and 4 are side views of an apparatus according to the present invention, showing the main phases of its operation.

As may be seen from FIG. 2, the housing projections 34 and 36 are engaged, outside the side frame wall 16, in the guide slots of movable guide members 38 and 40 supported on the side frame wall 16. The movable guide members 38 and 40 are integral with gears 42 and 44 respectively, which are movable about shafts 46 and 48 respectively, these latter being journalled in the wall 16. An intermediate gear 50, movable about a shaft 52 likewise borne by the wall 16, is positioned between the gears 42 and 44 and meshes with both of them. The gears 42, 44 and 50 thus form a rotary assembly. The slotted guide members 38, 40 are fixed to the gears 42, 44, respectively, and are fixed in a given angular orientation by the intermediate gear 50, so that the gears rotate as the housing moves between its released and loaded positions, and the gears 38, 40 and guide members 38, 40 are synchronized in their movement and guide the movement of the housing via the projections 34, 36.

The rotation of the gears 42, 50 and therefore that of the gear 44 likewise, as well as the displacement of the housing 22, are subjected to the action of a spring stretched between two hooks 54, 56 provided on the gears 42 and 50 respectively.

Figure 4:
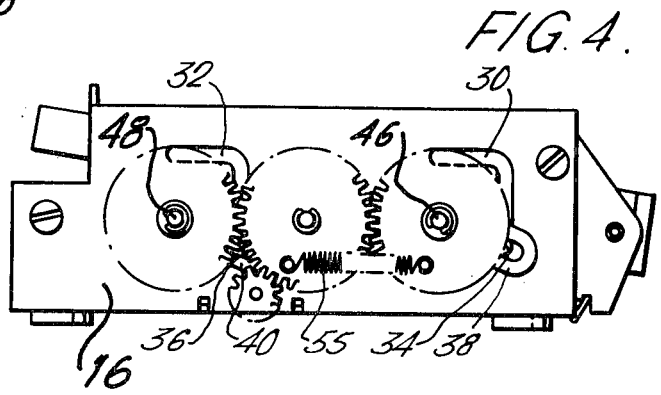

Referring to FIGS. 1, 2 and 4 it will be seen that a guide mechanism with gears and movable guide members, similar to that provided on the wall 16, is also provided on the outside of the wall 14; the various elements, which will not be enumerated separately, bear the same reference numbers as the corresponding elements of the wall 16, described above, but with an apostrophe. For coordinating the movement of the guide members 38', 40' on one side frame means 16 with the guide members 38', 40' on the other side frame means 14, a connecting shaft 60 journalled at its two ends in the two walls 14 and 16, is fitted at the said two ends with pinions 58 and 58', meshing with the toothed wheels 50 and 50', respectively. These two pinions 58 and 58' and their common shaft 60 constitute a kinematic connection between the two sets of movable guide members and gears. This kinematic connection coordinates the speed and amplitude of the displacement of the various components in motion and ensures a symmetrical distribution of the forces over these components, even when they are subjected to asymmetrical or unilateral external forces.

A pivoting handle 62 (FIG. 1) is borne by a rod 64 integral with one of the walls 14 and 16, in the present case the wall 14. The movement of this handle is limited by a slot 68 in a side cheek 67, and the handle 62, unless operated manually, is held in a raised position, by the force of a helicoidal spring 66 mounted on the rod 64. When this handle is actuated and moved towards the bottom of the slot 68, against the action of a spring 66, is acts with a lug 70, provided on the gear 44', as a crank means to rotate the gears 42', 44' in a clockwise direction (as seen in FIG. 1) and also, as a result of the interaction between the movable guide members 38' and 40' and the projections 34', 36' causes the cassette housing to move from the loaded position to the released position shown in FIG. 1.

The operations of loading and releasing a cassette in the apparatus 10 will now be described in greater detail by reference to FIGS. 2 to 4, which show different phases of these operations. After a cassette has been placed in the housing 22 it is sufficient to exert a very slight manual pressure on the cassette or the housing 22 to cause the said housing to move the cassette, first in opposition to and subsequently under the action of the spring 55, into the loaded position shown in FIG. 4. The assembly consisting of the cassette and the housing 22 is first moved parallel to the insertion and sliding plane of the cassette, the projections 34 and 36 thereby sliding in the guide grooves 30 and 32, taking the movable guide members 38 and 40 with them and causing them to pivot about the shafts 46 and 48. It will be understood that the elements symmetrical to those shown in FIGS. 2 to 4 but not appearing in the latter undergo corresponding movements; in the functional description, however, reference will only be made to the elements visible in FIGS. 2 to 4.

The movement produced by the manual pressure on the cassette or housing 22 thus causes the gears 42, 44 and 50 to rotate in the direction shown by the arrows in FIG. 2. It may be seen that the initial rotation of the gears 42 and 50 in the direction shown by the arrows, starting from the position illustrated in FIG. 2, has to be performed against the force of the spring 55. This spring 55 and particularly the two hooks 54 and 56 between which it is stretched are positioned in such a way that the angle of rotation of the two gears 42 and 50 which is required in order to produce the extension of the spring and the maximum distance between the hooks 54 and 56 is very small. That amplitude of displacement of the housing which corresponds to such an extension of the spring 55 and which can only be effected manually is thus extremely limited. As soon as the spring 55 has passed through its maximum extension, its retraction will automatically cause the gears 42 and 50 to rotate in the direction shown by the arrows in FIG. 2. FIG. 3 illustrates the continuation of the movement of the housing 22 and of the cassette, this movement being effected solely under the action of the spring 55. As may be seen from FIG. 3, the contraction of the spring 55 begins before the projections 34 and 36 have reached the bend portion in the guide grooves 30 and 32. The continuation of the movement generated by the contraction of the spring 55 corresponds to a displacement of the projections 34 and 36 in a direction perpendicular to the initial traversing movement and causes the housing 22 and the cassette to descend as far as the loaded position shown in FIG. 3, in which the spring 55 is slackened.

Figure 3:
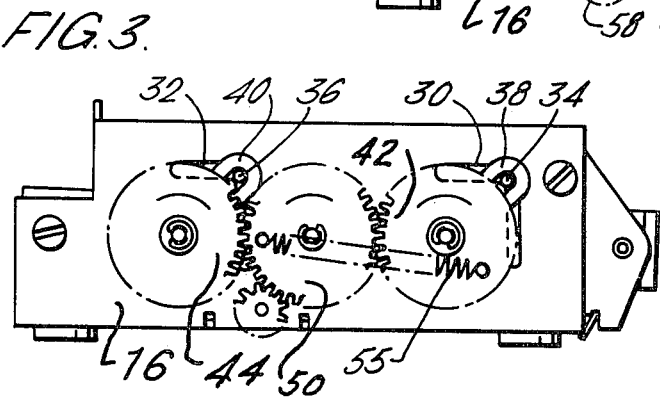

The operation of loading a cassette thus essentially comprises a first phase in which the housing 22 is actuated manually in opposition to the action of the spring 55, followed by a second phase which commences somewhere between the positions shown in FIGS. 2 and 3 at the moment when the spring 55 has reached its maximum extension and which continues automatically as a result of the contraction of this spring, reaching the operative position shown in FIG. 4.

In order to disengage the cassette from the operative position the gear 44' is actuated by the ejection handle 62, in the direction opposite to that corresponding to the loading of the cassette. Thus, by actuating the handle 62 against the force of the helicoidal spring 66, the crank action of this handle and the lug 70 on the gear 44' causes the gears 42, 44 and 50 to rotate in the direction opposite to that shown by the arrows in FIG. 2. During this phase of the movement, which takes place in opposition to the force of the spring 55, the movable guide members 38 and 40 are lifted from the position shown in FIG. 4 into the position shown in FIG. 1. In the final phase of the release of the cassette the rotation of all the gears is assisted by the contraction of the spring 55. The cassette is automatically ejected from the housing by inertia when the housing is suddenly stopped in the released position, the projections 34 and 36 abutting against the end of the guide grooves 30 and 32.

Both during the loading of the cassette and during its release the different moments which are exerted on all the gears or pinions 42, 44, 50 and 42', 44' and 50', and which are generated either by the contraction of the spring 55, by the manual action exerted on the cassette or its housing 22 or else by the manual action exerted on the release handle 62, are coordinated with one another via the connecting shaft 60 and the two pinions 58 and 58'.

The present invention enables the springs 55 and 55' to be allocated a far more important function than the corresponding springs in the apparatus already known, in which the springs essentially serve to assist the descending movement of the housing to the operative position and to secure it in this position. In this known device the initial phase in which the housing is displaced in opposition to the action of the springs thus lasts for a fairly long time and does not terminate until the projections of the housing have reached the bend portions of the guide grooves. According to the present invention, on the other hand, the initial phase is very short and the active part of the springs 55 and 55' commences well before the descending movement of the housing to the operative position. The action required on the part of the operator in the loading of the cassette is thus more limited, in the present invention, since all that is necessary is to initiate the engagement movement of the housing, the movement then continuing automatically as far as the operative position, as a result of the action of the springs 55 and 55'.

The action required on the part of the operator is limited, apart from that of sliding the cassette into its housing, to the exertion of a very slight pressure on the cassette or on the housing in order to initiate the engagement movement. There are two reasons why this pressure is very slight. The first is that the two springs 55 and 55', to fulfill the functions allocated to them, do not have to be very strong, so that they only present a very slight resistance to a movement effected in opposition to them. The second reason is that a favorable transmission ratio of manual force applied to the housing 22, to force exerted to stretch the spring 55, is provided by the mechanism. In other words, the tractive forces exerted on the spring 55 by the rotation of the pinions 42 and 50 are a multiple of the thrust exerted manually on the housing and transmitted by the movable guide members to the pinions. This transmission ratio increases progressively as the spring 55 is stretched from the position shown in FIG. 2 towards its maximum extension. This ratio would even become infinite on the passage of the spring through its point of maximum extension if losses such as those caused by friction were disregarded.

The fact that both the amplitude and the intensity of the manual thrust exerted on the housing must only be very slight constitutes a major advantage, particularly for small-size portable recording and playback apparatus. Furthermore, it is not necessary to exert a thrust on the middle of the housing in order to initiate the engagement of the cassette, since a symmetrical distribution of the forces is ensured by the connecting shaft 60. There is thus no risk of incorrect operation or abnormal or uneven wear, despite the fact that very little attention is required on the part of the operator.

In the known apparatus, in which the springs act directly on the cassette housing, the only kinematic connection between the driving means actuating this housing is formed by the housing itself. Now since the latter must be at least partly open on three sides, the fourth side and the U-shaped channels have to be reinforced in order to ensure sufficient rigidity and reduce the risk of oblique displacement of the housing as a result of unilateral load, such as, by way of example, a manual pressure exerted away from the middle of the cassette, a difference between the forces of the two springs, etc.

In the present invention, on the other hand, all the movable guide members are coordinated in their movement by a gearing connection, and the housing and the cassette are positively maintained perpendicular to the tape transport means as the cassette is lowered into engagement with such means, which maintains and insures the correct positioning of the cassette on the driving means of recording and playback apparatus. The kinematic connection between the movable parts being ensured by the connecting shafts 60, the only function allocated to the housing is that of bringing the cassette from the released position to the loaded position and vice versa. The construction and manufacture of the cassette housing are thus not subject to any particular rigidity requirement, and the functions of the housing permit a very lightweight construction. The housing could even be reduced to the two lateral slide channels, i.e., the connecting plate 28 could be dispensed with. In this case, however, it would be necessary to make certain that the slide channels were not only guided but also secured by the guide grooves, an object which can be achieved, for example, by replacing the projections 34, 36, 34' and 36' by movable rollers provided with a peripheral groove of U-shaped cross section, designed to interact with the walls around the guide grooves. The shafts of these rollers would then engage the movable guide members.

The present invention also enables the release mechanism to be simplified to the maximum possible extent, while at the same time preserving its efficiency and reliability. The handle 62 enables the force of the spring 55 to be easily counteracted, in order to lift the housing 22 with the cassette, and this handle is extremely simple and easy to operate. As a result of the connection provided by the shaft 60 it is sufficient, in contradistinction to existing systems, to operate the release devices on one side only.

Finally, it should be noted that the gears, the movable guide members and the slide channels of the housing can be made of synthetic material, which reduces the cost of manufacture and ensures very noiseless operation.

The design of the cassette loading and release apparatus according to the present invention is not limited to the embodiment illustrated in the diagrams and described in the foregoing. Those skilled in the art will be able to introduce numerous modifications or design variants without departing from the scope of the invention. In particular, it is possible to provide the gears at different levels on the different sides and to adopt a triangular arrangement. In this case it is even possible to dispense with the connecting gears 58 and 58' and to position the connecting shaft 60 between the intermediate gears 50 and 50', although these gears would then have to be mounted in such a way that the said arrangement of the shaft 60 did not impede the movement of the cassette housing 22.

I claim as my invention:

1. In apparatus for loading and releasing cassettes of magnetic tape, for use in recording and playback equipment, said cassettes having openings in a main face for tape transport means which penetrate said openings, said apparatus comprising a housing into which a cassette is introduced by a sliding movement in a plane parallel to its main face and which is movably mounted for movement together with said cassette on an L-shaped path having one leg substantially parallel to and a second leg substantially perpendicular to said plane, in order to cause the cassette to engage said tape transport means in a cassette loaded position, a frame having a pair of said frame means, mounting means on the external lateral sides of said housing cooperating with guiding means on said side frame means for mounting said housing for forward movement on said path for said cassette loaded position at one extremity and for return movement on said path to a cassette released position at the opposite extremity, the improvements comprising movable guide members for said housing mounting means supported on each said side frame means, control means coordinating the movement of said movable guide members on one side frame means with the movement of said movable guide members on the other side frame means, and spring means acting on said control means to resiliently force said housing toward its loaded and released positions at the extremities of said path.

2. In apparatus for loading and releasing cassettes, the improvements as defined in claim 1, wherein said guiding means includes L-shaped guide grooves in each said frame means, and said housing mounting means comprises a pair of projections provided on each external lateral side of said housing engaged in said guide grooves in an adjacent side frame means, and wherein said movable guide members on each side frame means includes a pair of pivotal elements each having a guide slot for one of said projections, and said control means includes a set of meshing gears on each side frame means including a gear pair fixed to said pair of pivotal elements, respectively, and an intermediate gear, and gear means interconnecting said sets of gears for coordinating the movement of said movable guide members.

3. In apparatus for loading and releasing cassettes, the improvements as defined in claim 2, wherein said spring means includes at least one tension spring connected between eccentric locations on an intermediate gear and another gear of one of said gear sets, so that said spring is extended by rotation of said gears upon movement of said housing from either its loaded or released positions and resiliently forces said housing toward the other of said positions after undergoing a maximum extension.

4. In apparatus for loading and releasing cassettes, the improvements as defined in claim 3, wherein each pair of pivotal elements, fixed to a pair of gears, respectively, are fixed in a given relative angular orientation by an intermediate gear between said pair of gears, and are synchronized in their pivotal motion by said intermediate gear, and wherein said eccentric locations between which said spring is connected are established so that said spring undergoes a maximum extension when said housing occupies a position intermediate its released and loaded positions.

5. In apparatus for loading and releasing cassettes, the improvements as defined in claim 4, wherein said eccentric locations between which said spring is connected are established so that said spring will undergo a maximum extension when said housing occupies a position nearer to its released position than to its loaded position.

6. In apparatus for loading and releasing cassettes, the improvements as defined in claim 2, further including manually operable crank means for rotating one of said gears for shifting said housing between its loaded and released positions.

* * * * *